US009500320B1

(12) United States Patent
Green et al.

(10) Patent No.: US 9,500,320 B1
(45) Date of Patent: Nov. 22, 2016

(54) ELECTRICAL CONNECTOR ADAPTERS FOR LIGHT FIXTURES

(71) Applicants: Russell Bryant Green, Douglasville, GA (US); DeShawn Anwar Ingram, Ellenwood, GA (US)

(72) Inventors: Russell Bryant Green, Douglasville, GA (US); DeShawn Anwar Ingram, Ellenwood, GA (US)

(73) Assignee: Cooper Technologies Company, Houston, TX (US)

( * ) Notice: Subject to any disclaimer, the term of this patent is extended or adjusted under 35 U.S.C. 154(b) by 178 days.

(21) Appl. No.: 14/268,443

(22) Filed: May 2, 2014

(51) Int. Cl.
*B60Q 3/04* (2006.01)
*F21K 99/00* (2016.01)

(52) U.S. Cl.
CPC ........................................ *F21K 9/13* (2013.01)

(58) Field of Classification Search
CPC .............. F21K 9/10; F21K 9/13; F21S 8/02; F21S 8/04; F21V 17/06; F21V 17/08; F21V 19/00; F21V 19/001; F21V 21/008; F21V 23/00; F21V 23/003; F21V 23/06; H01R 33/22; H01R 33/94; H01R 33/945; H01R 13/7172
USPC ......................... 362/362, 364, 651, 652, 368; 439/620.21, 620.02, 638, 644–646, 439/650–656, 671–672, 680; 363/13, 146
See application file for complete search history.

(56) References Cited

U.S. PATENT DOCUMENTS 3,452,215 A * 6/1969 Alessio .................. H01R 33/94 307/146
2010/0330843 A1 * 12/2010 Gao ..................... H01R 31/065 439/620.21
2012/0326623 A1 * 12/2012 Fatt .................... H01R 13/6675 315/291

* cited by examiner

*Primary Examiner* — Jason Moon Han
*Assistant Examiner* — Omar Rojas Cadima
(74) *Attorney, Agent, or Firm* — King & Spalding LLP

(57) ABSTRACT

An electrical connection adapter for an existing light fixture is described herein. The adapter can include a housing having at least one wall that forms a chamber disposed between a top side and a bottom side of the housing. The adapter can also include a first connection feature disposed within the top side of the housing and configured to couple to an electrical connector for the existing light fixture. The adapter can further include a second connection feature disposed within the bottom side of the housing. The adapter can be configured to couple to a light source of a retrofit light fixture. The adapter can also include a power transfer device disposed within the chamber of the housing, where the power transfer device has a first end electrically coupled to the first connection feature and a second end electrically coupled to the second connection feature.

18 Claims, 4 Drawing Sheets

ELECTRICAL CONNECTOR ADAPTERS FOR LIGHT FIXTURES

TECHNICAL FIELD

The present disclosure relates generally to an electrical plug connector and more particularly to systems, methods, and devices for adapters for electrical connectors.

BACKGROUND

People with light fixtures at times replace one or more of these fixtures. Replacing a light fixture often requires decoupling the old fixture both mechanically and electrically and coupling the new fixture both mechanically and electrically in the area that the fixture will be positioned. In addition, a new installation of a light fixture into a vacant receptacle (e.g., a covered and unused junction box in a ceiling for a ceiling fan and/or light source) requires electrical and mechanical work.

Many consumers are not comfortable with personally handling electrical issues, which can result in them putting off installation and/or replacement of the fixture or having to wait and hire an experienced electrician to help them with the new installation and/or replacement. Replacement of the fixture can also entail painting or repairing a wall or other surface that the replacement fixture is being coupled to and can result in other additional expenses. In addition, many light fixtures use lighting technologies that are not as efficient and/or effective as light-emitting diode (LED)-based lighting systems.

SUMMARY

In general, in one aspect, the disclosure relates to an electrical connection adapter for an existing light fixture. The adapter can include a housing having at least one wall that forms a chamber disposed between a top side and a bottom side of the housing. The housing can also include a first connection feature disposed within the top side of the housing, where the first connection feature is configured to couple to an electrical connector for the existing light fixture. The adapter can further include a second connection feature disposed within the bottom side of the housing, where the second connection feature is configured to couple to a light source of a retrofit light fixture. The adapter can also include a power transfer device disposed within the chamber of the housing, where the power transfer device includes a first end electrically coupled to the first connection feature and a second end electrically coupled to the second connection feature, where the power transfer device is configured to receive a power input at the first end from the first connection feature, and where the power transfer device is configured to deliver a power output at the second end to the second connection feature.

In another aspect, the disclosure can generally relate to a light fixture. The light fixture can include an existing light fixture having an electrical connector. The light fixture can also include a retrofit light fixture having a light source and a connection adapter electrically coupled to the electrical connector and the light source. The connection adapter of the retrofit light fixture can include a housing having at least one wall that forms a chamber disposed between a top side and a bottom side of the housing. The connection adapter of the retrofit light fixture can also include a first connection feature disposed within the top side of the housing, where the first connection feature is electrically coupled to the electrical connector of the existing light fixture. The connection adapter of the retrofit light fixture can further include a second connection feature disposed within the bottom side of the housing, where the second connection feature is coupled to the light source of the retrofit light fixture. The connection adapter of the retrofit light fixture can also include a power transfer device disposed within the chamber of the housing, where the power transfer device includes a first end electrically coupled to the first connection feature and a second end electrically coupled to the second connection feature, where the power transfer device is configured to receive a power input at the first end from the connection feature, and where the power transfer device is configured to deliver a power output at the second end to the light source.

In yet another aspect, the disclosure can generally relate to a lighting system. The lighting system can include an existing light fixture portion having a power source and an electrical connector. The lighting system can also include a retrofit light fixture portion having a light source and a connection adapter electrically coupled to the electrical connector and the light source. The connection adapter of the retrofit light fixture portion can include a housing having at least one wall that forms a chamber disposed between a top side and a bottom side of the housing. The connection adapter of the retrofit light fixture portion can also include a first connection feature disposed within the top side of the housing, where the first connection feature is electrically coupled to the electrical connector of the existing light fixture. The connection adapter of the retrofit light fixture portion can further include a second connection feature disposed within the bottom side of the housing, where the second connection feature is coupled to the light source of the retrofit light fixture. The connection adapter of the retrofit light fixture portion can also include a power transfer device disposed within the chamber of the housing, where the power transfer device includes a first end electrically coupled to the first connection feature and a second end electrically coupled to the second connection feature, where the power transfer device is configured to receive a power input at the first end from the connection feature, and where the power transfer device is configured to deliver a power output at the second end to the light source.

These and other aspects, objects, features, and embodiments will be apparent from the following description and the appended claims.

BRIEF DESCRIPTION OF THE DRAWINGS

The drawings illustrate only example embodiments and are therefore not to be considered limiting of its scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
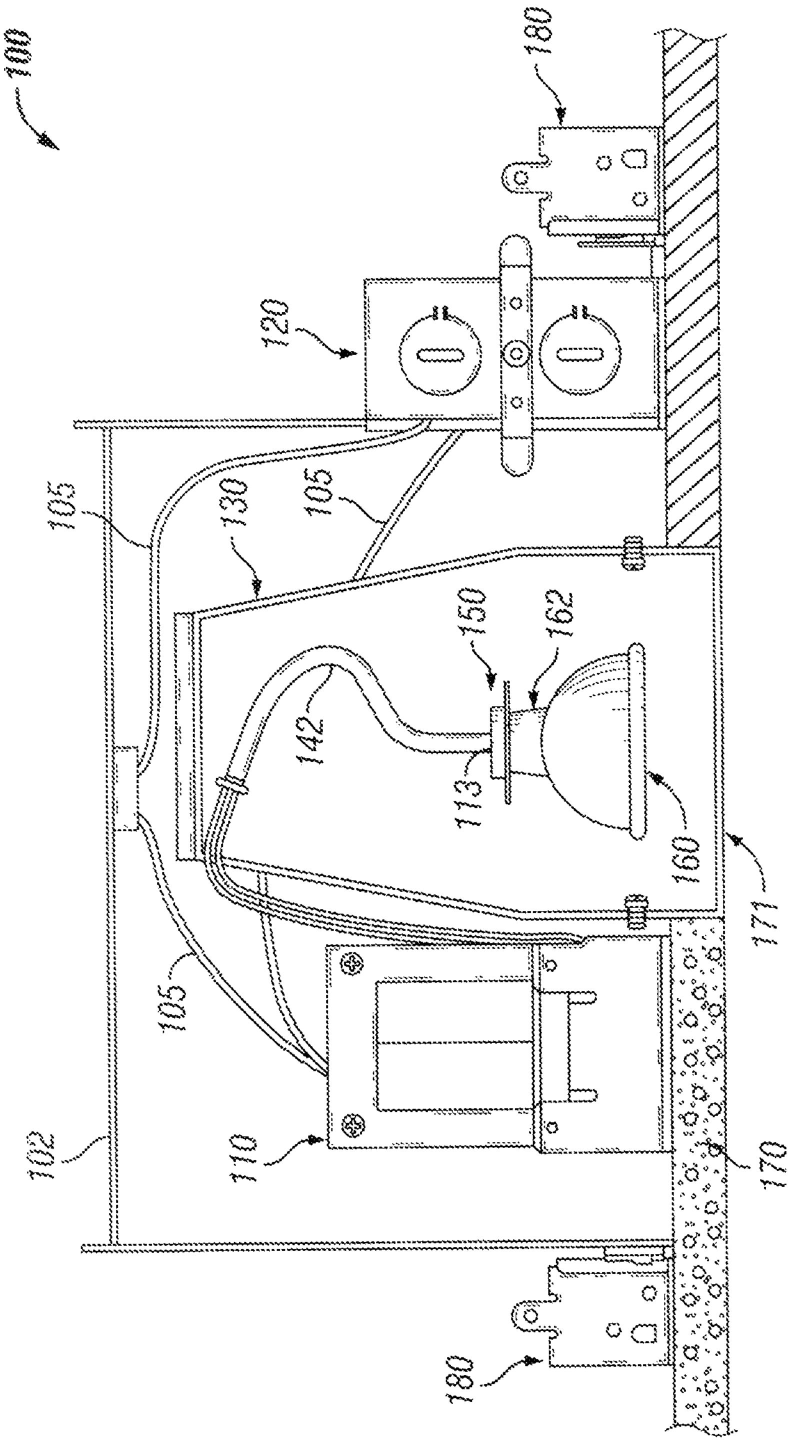
FIG. 1 shows a lighting system in accordance with one or more example embodiments.

The example embodiments discussed herein are directed to systems, apparatuses, and methods of electrical connector adapters for light fixtures. Such electrical connector adapters (or, more simply, "adapters") can be used for retrofitting existing fixtures with LED light fixtures. As used herein, "existing fixture" can mean an existing light fixture that is being replaced, at least in part, by a retrofit light fixture using an example adapter. In addition, or in the alternative, "existing fixture" can mean a vacant receptacle that can receive a retrofit light fixture using an example adapter, but that currently does not have a lighting fixture that is being replaced.

Such existing light fixtures can have one or more of a number of types of socket into which one or more light sources are electrically and mechanically coupled. Examples of a socket can include, but are not limited to, an Edison screw base of any diameter (e.g., E26, E12, E14, E39), a bayonet style base, a bi-post base, a bi-pin connector base, a wedge base, and a fluorescent tube base. A light source of the existing light fixture can electrically and mechanically couple to the socket and can be of a light source type that corresponds to the socket of the existing light fixture. Examples of light source types of the light source can include, but are not limited to, incandescent lamps, LEDs, halogen lamps, G10/GU10, G9/GU9, AR111/PAR36, T3, MR-11, and MR-16. If the light source of the existing fixture is a LED, the LED can be of one or more of a number of types of LED technology, including but not limited to discrete LEDs, LED arrays, chip-on-board LEDs, edge lit LED panels, and surface mounted LEDs.

Such existing light fixtures can be mounted in, or can be, a junction box (also called a j-box), a recessed luminaire, or some other base for the fixture. In certain example embodiments, the junction box, recessed luminaire, or other base is mounted in a ceiling or other surface so that the light emitted by the fixture is directed downward (down light), away from the ceiling or other surface. Such a base for an existing fixture can be electrically coupled to a power source to provide power and/or control to the light fixture. The power source can provide the existing light fixture with one or more of a number (and/or a range) of voltages, including but not limited to 120 V alternating current (AC), 110 V AC, 240 V AC, 24 V direct current (DC), and 0-10 V DC. As a specific example, if the power source of the existing light fixture is used to supply power to a MR16 halogen lamp (the light source of the existing light fixture), the power source can generate 12V AC.

Such existing light fixtures can be of any size and/or shape, and can have any number of sockets and/or wires. Such existing light fixtures can be located indoor and/or outdoors and can be mounted to a surface (e.g., wall, ceiling, pillar), be part of a lamp, or be used with any other suitable mounting instrument where a down light is used. Such existing light fixtures can be used in residential, commercial, and/or industrial applications. Such existing light fixtures can operate from a manual device (e.g., on/off switch, dimming switch, pull chain), a photocell, a timer, and/or any other suitable mechanism.

When a retrofit light fixture using an example adapter is retrofitted over an existing light fixture, the at least one or more portions (e.g., the junction box, the recessed luminaire) of the existing light fixture remains as part of the retrofitted light fixture, while the remaining components of the existing light fixture are removed. For example, the socket, the lens, the trim, and the light source of the existing light fixture can be removed. In certain example embodiments, at least the light source of the existing light fixture is replaced. In certain example embodiments, the power input that fed the light source of the existing light fixture is not compatible in type (e.g., AC, DC) and/or amount (e.g., 120V, 24V) for the LED light source of the retrofitted light fixture.

When a retrofit light fixture is installed using example adapters, one or more of a number of electrical and/or mechanical standards can apply. For example, if the retrofit light fixture uses LEDs and is installed in a junction box, the National Electric Code (NEC) requires that there is at least two cubic inches of space per wire (although multiple ground wires are only counted once). As another example, the International Electrotechnical Commission (IEC) maintains IEC Standard 60061-1 (7004-72) that applies to Type G4 base and MR-11 bulbs. Further, Underwriters' Laboratory (UL) endorses many of these NEC and IEC standards. As another example, UL has standards (e.g., UL1598) for LED light fixtures that are retrofit into existing light fixtures. Example adapters described herein can allow such retrofitted LED light fixtures to comply with such standards.

The shape of the light fixtures described herein can have one or more of a number of shapes, including but not limited to circular, square, triangular, rectangular, hexagonal, oval, and random. The retrofit light fixtures using example adapters described herein can be pendant lights, surface mount, recessed, and/or any other type of light fixture. In one or more example embodiments, a user is any person that interacts with light fixtures. For example, a user may be, but is not limited to, a maintenance worker, an electrician, a contractor, an engineer, a supervisor, a home owner, a business owner, and a company representative.

Any component described in one or more figures herein can apply to any subsequent figures having the same label. In other words, the description for any component of a subsequent (or other) figure can be considered substantially the same as the corresponding component described with respect to a previous (or other) figure. Further, if a component associated with a figure is described but not expressly shown or labeled in the figure, a corresponding component shown and/or labeled in another figure can be inferred. The numbering scheme for the components in the figures herein parallel the numbering scheme for the components of previously or subsequently described figures in that each component is a three digit number having the identical last two digits.

Example embodiments for retrofitting existing fixtures using example adapters will be described more fully hereinafter with reference to the accompanying drawings, in which example embodiments of retrofitting existing fixtures using example adapters are shown. Retrofitting existing fixtures using example adapters may, however, be embodied in many different forms and should not be construed as limited to the example embodiments set forth herein. Rather, these example embodiments are provided so that this disclosure will be thorough and complete, and will fully convey the scope of retrofitting existing fixtures using example adapters to those or ordinary skill in the art. Like, but not necessarily the same, elements (also sometimes called components) in the various figures are denoted by like reference numerals for consistency. Terms such as "first," "second," "top," and "bottom" are used merely to distinguish one component (or part of a component) from another. Such terms are not meant to denote a preference or a particular orientation.

FIG. 1 shows a light system 100 in accordance with one or more example embodiments. In one or more embodiments, one or more of the components shown in FIG. 1 may be omitted, repeated, and/or substituted. Accordingly, embodiments of a lighting system using example adapters should not be considered limited to the specific arrangements of components shown in FIG. 1.

Referring to FIG. 1, the light system 100 can include a frame 102, inside of which can be disposed a power source 110, a housing 130, and one or more electrical cables 105. The housing 130 can have disposed therein an electrical feed 112, an example adapter 150, and a retrofit light fixture 160. The light system 100 can also include a junction box 120 and one or more mounting brackets 180. In this example, the light system 100 is mounted above a ceiling 170, and the distal end of the housing 130 is disposed within an opening 171 in the ceiling 170. Except for the adapter 150 and the retrofit light fixture 160, all components shown in FIG. 1 are part of an existing light fixture.

One or more electrical cables 105 can carry voltage and/or current from an external power source (not shown) to the power source 110 and/or the junction box 120. Examples of an external power source can include, but are not limited to, a wall outlet, a fuse box, a battery, and a solar panel. Each electrical cable 105 can have one or more electrical conductors disposed therein. In one or more example embodiments, the electrical cable 105 includes a ground or neutral conductor, through which no current or voltage flows. Each electrical conductor within an electrical cable 105 may be of any suitable size (e.g., 12 American Wire Gauge (AWG)) and made of one or more of a number of materials (e.g., copper, aluminum). Each electrical cable 105 may be coated with an insulator made of any suitable material (e.g., rubber, plastic) to keep the electrical conductors electrically isolated from any other conductor in the electrical cable 105.

The power flowing through each electrical cable 105 may be in AC form or direct current DC form. When the power is in AC form, there may be two electrical conductors (one for a single phase and one for the neutral line), or three electrical conductors (two for a power phase and one for the neutral line), or four electrical conductors (three for each power phase and one for the neutral line) in an electrical cable 105. When the power is in DC form, there may be two electrical conductors (one for a positive leg and one for a negative leg) in an electrical cable 105. The power flowing through each electrical cable 105 can be any level or range of levels of power suitable for receipt by the power source 110 of the existing light fixture. Some examples of power received by the power source 110 through the electrical cable 105 can include 120 V AC, 240 V AC, 480 V AC, and 24 V DC.

The power source 110 of the original light fixture receives the power from the external power and generates power input. In certain example embodiments, the power source 110 is a battery, a fuel cell, or some other original source of power. In such a case, there is no external power source, and so there is no electrical cable 105 feeding the power source 110. The power source 110 can be a ballast, a driver, or some other type of power supply. The power source 110 can include one or more of a number of components that alter the amount and/or a type of power relative to the amount and type of power received by the power source 110. Such components can include, but are not limited to, a transformer, a rectifier, and an inverter. The power source 110 can include solid state components and/or discrete components (e.g., resistors, capacitors, diodes).

The power input generated by the power source 110 can be of a type and amount suitable for use by the light source (now replaced by the retrofit light fixture 160 in the light system 100 of FIG. 1) of the existing light fixture. For example, if the light source of the existing light fixture is a MR16 halogen lamp, the power input generated by the power source 110 can be 12V AC. The following table shows examples of various types of bases of the existing light fixture that can be replaced using example adapters 150. The table also lists the standard to which some example retrofit light fixtures 160 using example adapters 150 can comply. Finally, the table gives example information about the distance between and diameter of the pins of the existing light fixture, which thus also corresponds to the distance between and diameter of the pins of the first connection feature (defined below with respect to FIGS. 2A and 2B) of the adapter 150.

| Type | Standard | Pin center to center | Pin diameter |
|---|---|---|---|
| G4 | IEC 60061-1 (7004-72) | 4.0 mm | 0.65-0.75 mm |
| GU4 | IEC 60061-1 (7004-108) | 4.0 mm | 0.95-1.05 mm |
| GY4 | IEC 60061-1 (7004-72A) | 4.0 mm | 0.65-0.75 mm |
| GZ4 | IEC 60061-1 (7004-64) | 4.0 mm | 0.95-1.05 mm |
| G5 | IEC 60061-1 (7004-52-5) | 5 mm | Various |
| G5.3 | IEC 60061-1 (7004-73) | 5.33 mm | 1.47-1.65 mm |
| G5.3-4.8 | IEC 60061-1 (7004-126-1) | N/A | Various |
| GU5.3 | IEC 60061-1 (7004-109) | 5.33 mm | 1.45-1.6 mm |
| GX5.3 | IEC 60061-1 (7004-73A) | 5.33 mm | 1.45-1.6 mm (ROUND PINS) |
| GY5.3 | IEC 60061-1 (7004-73B) | 5.33 mm | (FLAT PINS) |
| G6.35 | IEC 60061-1 (7004-59) | 6.35 mm | 0.95-1.05 mm |
| GX6.35 | IEC 60061-1 (7004-59) | 6.35 mm | 0.95-1.05 mm |
| GY6.35 | IEC 60061-1 (7004-59) | 6.35 mm | 1.2-1.3 mm |
| GZ6.35 | IEC 60061-1 (7004-59A) | 6.35 mm | 0.95-1.05 mm |
| G8 | N/A | 8.0 mm | Various |
| GY8.6 | N/A | 8.6 mm | Various |
| G9 | IEC 60061-1 (7004-129) | 9.0 mm | Various |
| G9.5 | N/A | 9.5 mm | 3.10-3.25 mm |
| GU10 | N/A | 10 mm | Various |
| GZ10 | N/A | 10 mm | Various |
| G12 | N/A | 12.0 mm | 2.35 mm |
| G13 | N/A | 0.50 in (12.7 mm) | 0.093 in (2.35 mm) |
| G23 | N/A | 23 mm | 2 mm |
| GU24 | N/A | 24 mm | Various |

-continued

| Type | Standard | Pin center to center | Pin diameter |
|---|---|---|---|
| G38 | N/A | 38 mm | 11.1 mm |
| GX53 | N/A | 53 mm | Various |

Since the light source of the existing light fixture is replaced by the retrofit light fixture 160, the power input generated by the power source 110 is delivered to the retrofit light fixture 160 through the electrical feed 112, also called a wire whip 112. The wire whip 112 is a type of electrical cable having an electrical connector 113 at its distal end. The electrical connector 113 at the distal end of the wire whip 112 is configured to electrically and mechanically couple to a complementary electrical connector disposed on the light source (now removed in FIG. 1) of the existing light fixture. The electrical connector 113 can include one or more of a number of pins, pin receivers, terminals, wires, and/or any other features that allow the electrical connector 113 to be electrically and mechanically coupled to the light source of the existing light fixture.

In certain example embodiments, the adapter 150 has disposed thereon an electrical connector that is substantially the same as the electrical connector disposed on the light source of the existing light fixture. In other words, the adapter 150 has an electrical connector that complements the electrical connector 113 at the distal end of the wire whip 112. In addition, the adapter 150 has disposed thereon another electrical connector that is substantially the same as the electrical connector 162 disposed on the retrofit light fixture 160 (or portion thereof). In other words, the adapter 150 has an additional electrical connector that complements the electrical connector 162 of the retrofit light fixture 160. Further details of the adapter 150 are provided below with respect to FIGS. 2A-3B. The electrical connector 162 can include one or more of a number of pins, pin receivers, terminals, wires, and/or any other features that allow the electrical connector 162 to be electrically and mechanically coupled to the adapter 150.

Figure 2A:
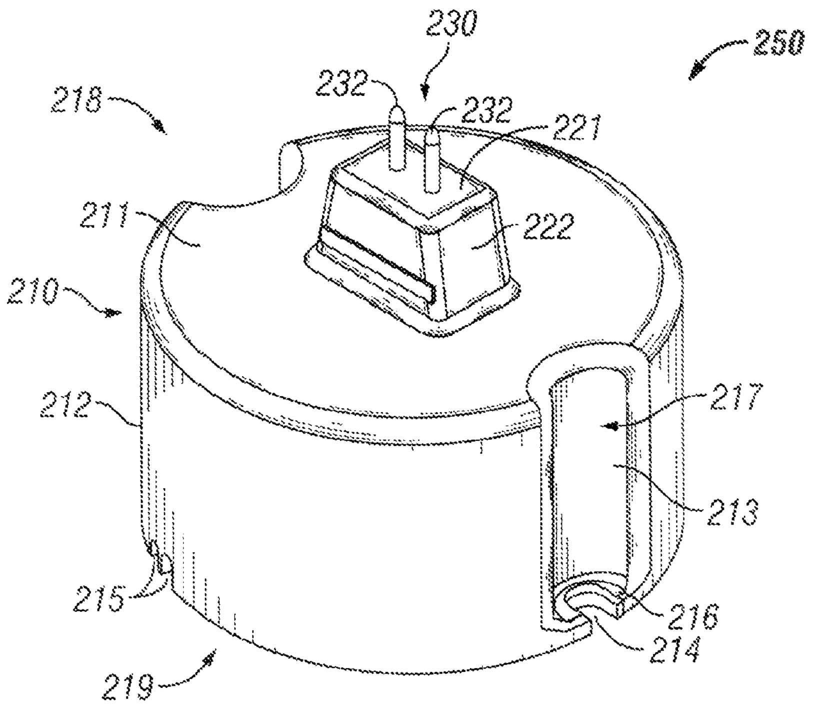
FIGS. 2A and 2B show various views of an electrical connector adapter in accordance with one or more example embodiments.
Figure 2B:
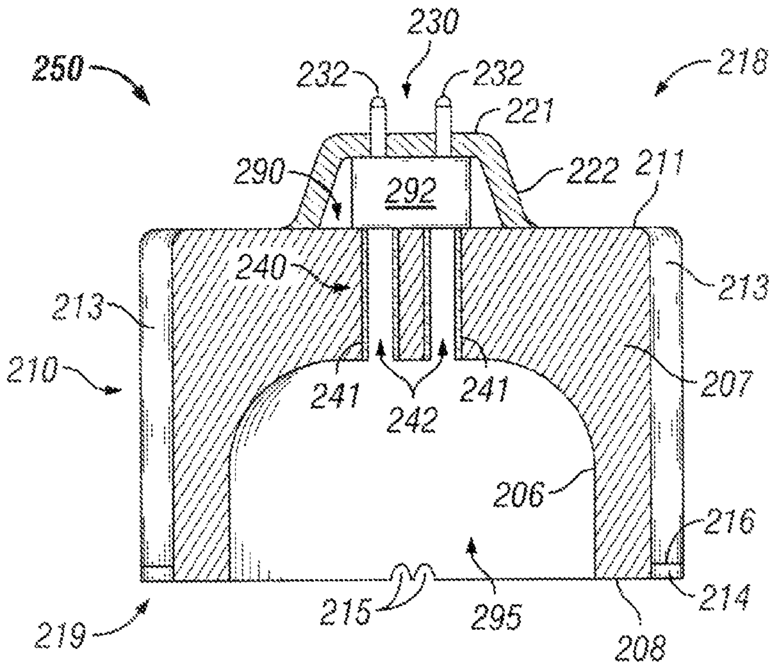

FIGS. 2A and 2B show various views of an electrical connector adapter 250 in accordance with one or more example embodiments. Specifically, FIG. 2A shows a top-side perspective view of the adapter 250, and FIG. 2B shows a cross-sectional side view of the adapter 250. In one or more embodiments, one or more of the components shown in FIGS. 2A and 2B may be omitted, repeated, and/or substituted. Accordingly, embodiments of electrical connector adapters should not be considered limited to the specific arrangements of components shown in FIGS. 2A and 2B.

Referring to FIGS. 1-2B, the adapter 250 of FIGS. 2A and 2B can include a housing 210, a first connection feature 230, a second connection feature 240, and a power transfer device 292. The housing 210 can have a top side 218 and a bottom side 219. The housing 210 can have one or more walls (e.g., wall 221, wall 222, wall 211, wall 212) that forms a chamber 290. The chamber 290 can be disposed between the top side 218 and the bottom side 219 of the housing 210. The chamber 290 can have a shape and a size within the housing 210. In certain example embodiments, the adapter 250 can be considered part of the retrofit light fixture 160. Alternatively, the adapter 250 can be considered an independent component separate from the retrofit light fixture 160.

The housing 210 can have one or more of a number of shapes, protrusions, and/or other features. Some of these features of the housing 210 can be driven by the shape and size of the chamber 290 within the housing 210. For example, as shown in FIGS. 2A and 2B, at least part of the chamber 290 (as well as the charge transfer device 292 disposed within the chamber 290), bounded by wall 221 and wall 222, can protrude above wall 211 on the top side 218 of the housing 210. The housing 210 can also have a body 207, which is a solid portion disposed between two or more walls. For example, in this case, the body 207 of the housing 210 is disposed between the wall 211, the wall 212, wall 208, and the wall 206. The housing 210 can be made of one or more of a number of materials, including but not limited to plastic, metal, and rubber.

The housing 210 can be made from a single piece, as from a mold. Alternatively, the housing 210 can be made multiple pieces that are coupled to each other, directly or indirectly, using one or more of a number of coupling methods. Such coupling methods can include, but are not limited to, fastening devices, mating threads, welding, epoxy, detents, slots, tabs, and compression fittings. As an example, the power transfer device 292 can be embedded into the body 207 of the housing 210 (collectively, the bottom side 219 of the housing 210), and the wall 211 on the top side 218 of the housing 210 can be removably coupled to the bottom side 219 of the housing 210 using mating threads.

In certain example embodiments, the housing 210 can have one or more of a number of coupling features disposed thereon. The coupling features can be used to couple the adapter 250 to one or more portions of the retrofit light fixture 260, the existing light fixture, and/or some other component (e.g., the ceiling 170) of the light system 100. For example, as shown in FIGS. 2A and 2B, the housing 210 has two coupling features 217. In this case, the coupling features 217 are two recesses 213, spaced on opposite ends of the housing 210, that run vertically along substantially all of the height of the housing 210. Each coupling feature 217 can also have a base 216 at the bottom of the recess 213. The base 216 of the coupling feature 217 can have an aperture 214 (or a slot 214) that traverses the base 216. The aperture 214 can be shaped and sized to receive a complementary coupling feature (e.g., a fastening device, a rivet, a protrusion) that directly or indirectly couples the housing 210 to one or more other components of the light system 100.

As a specific example, a screw (or other fastening device, not shown) can traverse the aperture 214 in the base 216 of the coupling feature 217, as well as a corresponding aperture in the retrofit light fixture 160 that aligns with the apertures 214 of the coupling feature 217. The screw can be inserted and/or removed by positioning a screwdriver (or some other tool) within the recess 213 to provide access to the head of the screw.

Figure 4:
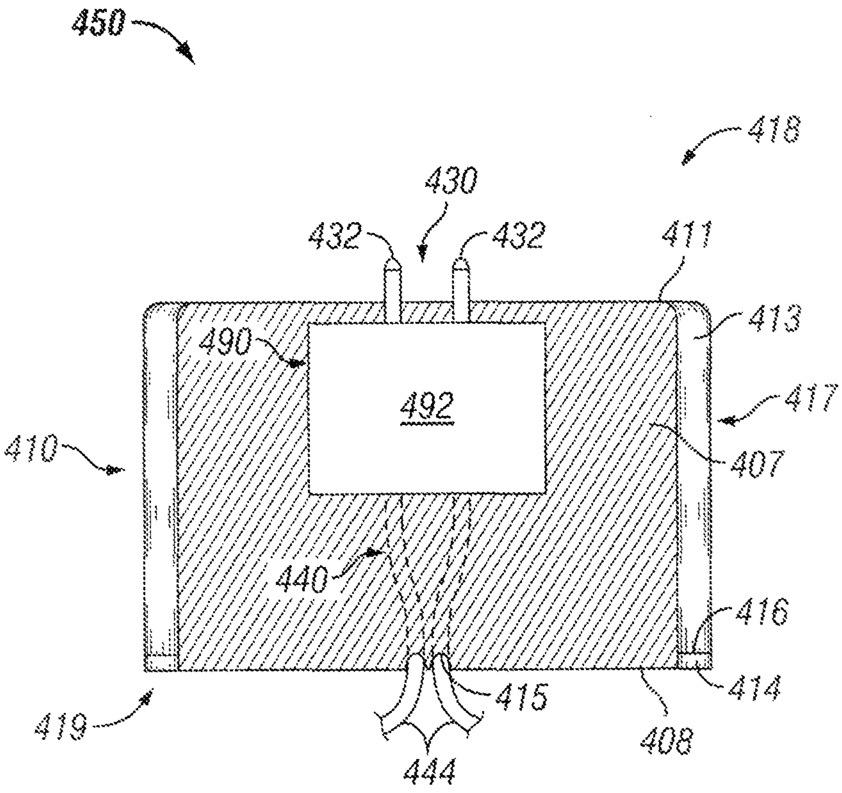
FIG. 4 shows a cross-sectional side view of yet another electrical connector adapter in accordance with one or more example embodiments.

In certain example embodiments, the housing 210 can also include one or more wireways 215 that traverse the housing 210. Each wireway 215 can receive at least one electrical wire (or electrical cable). Such an electrical wire can be used to electrically couple the power transfer device 292 to a portion (e.g., a light source) of the retrofit light fixture 160. In such a case, as shown in FIG. 4 below, the electrical wires can be hardwired to the power transfer device 292, and the electrical connector 162 of the retrofit light fixture 160 can be eliminated, essentially combining with the adapter 250. In this case, the wireways 215 are disposed along the bottom edge of wall 212 at the bottom side 219 of the adapter 250. The wireways 215 allow the electrical wires to pass therethrough without being pinched when the adapter 250 is mounted against the retrofit light fixture 160. Each wireway 215 can have a shape and size that is at least as large as the shape and size of the electrical wires that pass therethrough.

The first connection feature 230 can be disposed at any location of the housing 210 and traverse at least one wall of the housing 210. In this example, the first connection feature 230 is located at the top side 218 of the housing 210. Specifically, the first connection feature 230 in this case is disposed within (traverses) the wall 221 at the top side 218 of the housing 210. In certain example embodiments, the first connection feature 230 is configured to electrically couple to the electrical connector 113 on the wire whip 112 of the existing light fixture. The first connection feature 230 can include one or more of a number of electrical coupling features including but not limited to a pin (such as pins 232 shown in FIG. 2A), a pin receiver, a terminal block, an electrical wire, and a clip.

In certain example embodiments, the components and/or configuration of the first connection feature 230 can vary based on the electrical connector 113 on the wire whip 112 of the existing light fixture. For example, referring to the table above, the number of pins 232, the shape of the pins 232, the outer perimeter (e.g., perimeter) of the pins 232, the length of the pins 232, the orientation of the pins 232, and the spacing between the pins 232 can be based on, for example, the type of light source of the existing light fixture that is being replaced by the light source of the retrofit light fixture. The first connection feature 230 can be made out of one or more of a number of electrically conductive materials, including but not limited to copper and aluminum.

The second connection feature 240 can be disposed at any location of the housing 210 and traverse at least one wall of the housing 210. In this example, the second connection feature 240 is located toward the bottom side 219 of the housing 210. Specifically, the second connection feature 240 in this case is disposed within (traverses) the wall 206 at the bottom side 219 of the housing 210. In certain example embodiments, the second connection feature 240 is configured to couple to the light source (or, in some cases, to the electrical connector 162) of the retrofit light fixture 160. In certain example embodiments, as shown in FIG. 4 below, the second connection feature 240 is one or more electrical wires. The second connection feature 240 can include one or more of a number of electrical coupling features including but not limited to a pin, a pin receiver (such as pin receivers 242 bounded by pin receiver walls 241, as shown in FIG. 2B), a terminal block, an electrical wire, and a clip.

In certain example embodiments, the components and/or configuration of the second connection feature 240 can vary based on the electrical coupling features of the retrofit light fixture. For example, if the second connection feature 240 is one or more electrical wires, the number of electrical wires and the gauge size of the electrical wires can be based on, for example, the type of light source of the retrofit light fixture 160 that is replacing the light source of the existing light fixture. The second connection feature 240 can be made out of one or more of a number of electrically conductive materials, including but not limited to copper and aluminum.

In certain example embodiments, the bottom side 219 of the adapter 250 can have a cavity 295 formed by a wall 206. In such a case, the second connection feature 240 can be disposed within the cavity 295, and the electrical connector 162 of the retrofit light fixture 160 can be a type of plug connector that can be disposed within the cavity 295 when the electrical connector 162 is electrically coupled to the second connection feature 240. Alternatively, as shown in FIG. 4, there can be no cavity 295 and no wall 206.

The power transfer device 292 is electrically coupled to the first connection feature 230 and the second connection feature 240. The power transfer device 292 of the adapter 250 the power input, through the first connection feature 230, from the electrical connector 113 on the wire whip 112. The power transfer device 292 generates a power output based on the power input. The power transfer device 292 also delivers the power output to the light source of the retrofit light fixture 160. In certain example embodiments, the power transfer device 292 is a ballast, a driver, or some other type of power supply.

The power transfer device 292 can include one or more of a number of components that alter the amount and/or a type of power relative to the amount and type of power input received by the power transfer device 292. Such components can include, but are not limited to, a transformer (for raising or lowering a level of AC power), a rectifier (for generating DC power from AC power), and an inverter (for generating AC power from DC power). The power transfer device 292 can include solid state components and/or discrete components (e.g., resistors, capacitors, diodes). Further, some or all of the housing 210 can be made of a thermally conductive material to help dissipate heat generated by the power transfer device 292. In other words, some or all of the housing 210 can act as a heat sink.

The power output generated by the power transfer device 292 can be of a type and amount suitable for use by the light source of the retrofit light fixture 160. For example, if the light source of the retrofit light fixture is a MR16 LED lamp, the power output generated by the power transfer device 292 can be approximately 36V DC. If the power input received by the power transfer device 292 is 12V AC, then the power transfer device 292 includes a rectifier to create the 36V DC of power output from the 12V AC of power input.

In certain example embodiments, the input power received by the power transfer device 292 is adjusted by a dimmer control switch (not shown) of the existing light fixture. In such a case, the example adapter 250, using the power transfer device 292, has the added advantage of providing output power that can be adjusted by the dimmer control switch of the existing light fixture. For a specific example, we will assume that the input power generated by the power source 110 of the existing light fixture is 12 V AC when the dimmer control switch is at 100%, and that the power output generated by the power transfer device 292 of the retrofit light fixture is 36 V DC when the dimmer control switch is at 100%. In such a case, if the dimmer control switch of the existing light fixture is set at 50%, then the input power generated by the power source 110 of the existing light fixture is 6 V AC, and the power output generated by the power transfer device 292 of the retrofit light fixture is 18 V DC. If the dimmer control switch of the existing light fixture is set at 10%, then the input power generated by the power source 110 of the existing light fixture is 1.2 V AC, and the power output generated by the power transfer device 292 of the retrofit light fixture is 3.6 V DC. In other words, the dimmer control switch of the existing light fixture can be used to control the power output of the power transfer device 292 of the adapter 250 with substantially no limitations.

Figure 3A:
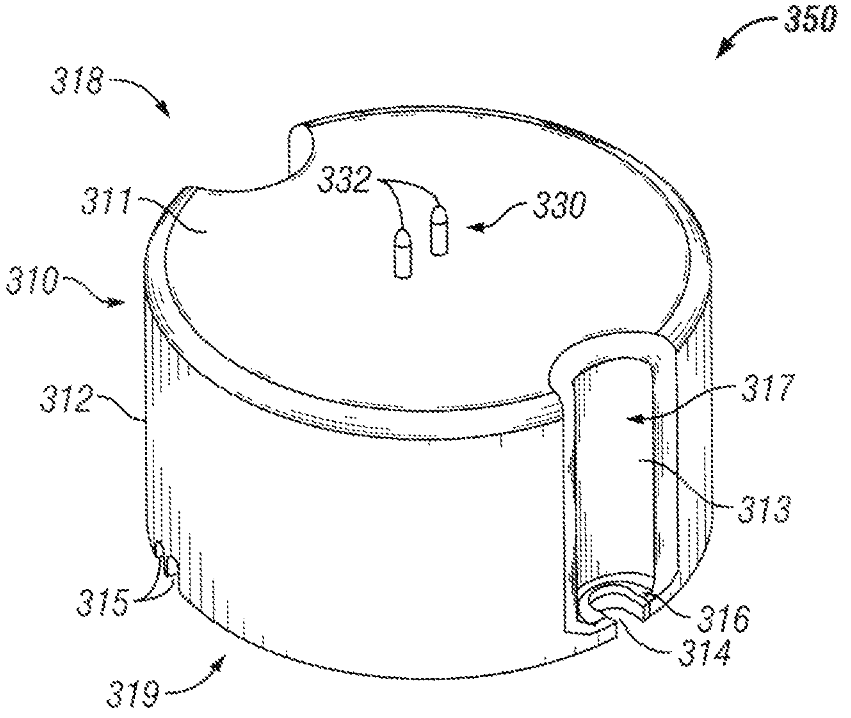
FIGS. 3A and 3B show various views of another electrical connector adapter in accordance with one or more example embodiments.
Figure 3B:
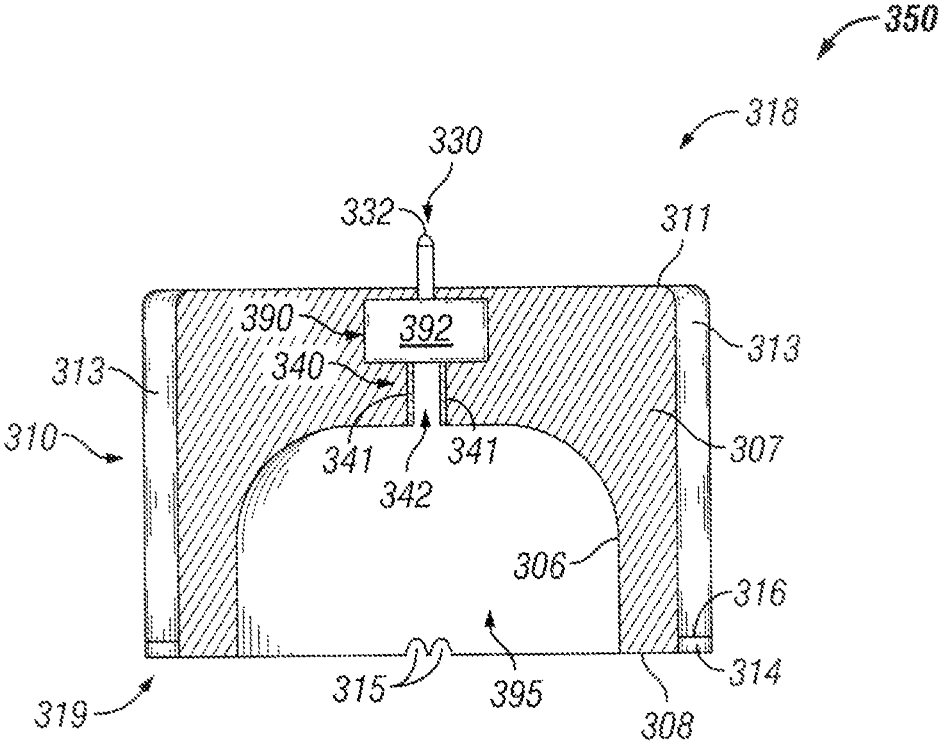

FIGS. 3A and 3B show various views of another electrical connector adapter 350 in accordance with one or more example embodiments. Specifically, FIG. 3A shows a top-side perspective view of the adapter 350, and FIG. 3B shows a cross-sectional side view of the adapter 350. In one or more embodiments, one or more of the components shown in FIGS. 3A and 3B may be omitted, repeated, and/or substituted. Accordingly, embodiments of electrical connector adapters should not be considered limited to the specific arrangements of components shown in FIGS. 3A and 3B.

Referring to FIGS. 1-3B, the adapter 350 of FIGS. 3A and 3B is substantially the same as the adapter 250 of FIGS. 2A and 2B, except as described below. The adapter 350 has a chamber 390 that is disposed entirely under wall 311. In this case, the pins 332 of the first connection feature 330 are the only components of the adapter 350 to protrude above the wall 311. In this case, the chamber 390 is substantially the same shape and size as the power transfer device 392. The chamber 390 is adjacent to the wall 311 and the body 307.

FIG. 4 shows a cross-sectional side view of yet another electrical connector adapter 450 in accordance with one or more example embodiments. In one or more embodiments, one or more of the components shown in FIG. 4 may be omitted, repeated, and/or substituted. Accordingly, embodiments of electrical connector adapters should not be considered limited to the specific arrangements of components shown in FIG. 4.

Referring to FIGS. 1-4, the adapter 450 of FIG. 4 is substantially the same as the adapter 250 and the adapter 350, except as described below. In this case, the second connection feature 440 of the adapter 450 are two electrical wires 444. One end of the electrical wires 444 is disposed within and electrically coupled to a portion of the power transfer device 492. The other end of the electrical wires 444 are disposed within and traverse the wireways 415 along the bottom edge of wall 412 at the bottom side 419 of the housing 410. The other end of the electrical wires 444 is configured to electrically couple to the light source of the retrofit light fixture 160. Thus, power output is delivered to the light source of the retrofit light fixture 160 from the power transfer device 492 using the electrical wires 444. As stated above, when the second connection feature 440 are electrical wires 444, there is no electrical connector (such as the electrical connector 162 shown in FIG. 1 above).

In addition, the adapter 450 of FIG. 4 has no cavity, such as the cavity 295 of FIG. 2B and the cavity 395 of FIG. 3B. Thus, in this case, the adapter 450 has fewer walls and a substantially flat bottom side 419. Further, the cavity 490 in which the power transfer device 492 is disposed can be substantially the same shape and size as the power transfer device 492. Alternatively, the cavity 490 can be larger than the size of the power transfer device 492, which decreases the volume of the body 407 of the housing 410.

The example embodiments discussed herein provide for simplified retrofitting of certain portions (e.g., trim, light source, lens) of existing light fixtures having less efficient, less attractive, and/or otherwise undesirable characteristics. Replacing part of an existing light fixture with a retrofit light fixture using example embodiments can create a new light system. Example embodiments allow for easy replacement of portions of an existing light fixture with a replacement light fixture, without the need for an electrician or other professional to perform the actions necessary to retrofit the existing light fixture. In some cases, because example electrical connection adapters provide a different amount and/or type of power to the light source of the retrofit light fixture, example embodiments can comply with one or more UL standards for a light fixture. Example embodiments can have different configurations based on the light source of the existing light fixture. Example embodiments can be reused for retrofitting different light fixtures over time.

Although the invention is described with reference to example embodiments, it should be appreciated by those skilled in the art that various modifications are well within the scope and spirit of this disclosure. Those skilled in the art will appreciate that the present invention is not limited to any specifically discussed application and that the embodiments described herein are illustrative and not restrictive. From the description of the example embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. An electrical connection adapter for an existing light fixture, comprising:

a housing comprising at least one wall and at least one coupling feature, wherein the at least one wall forms a chamber disposed between a top side and a bottom side of the housing, and wherein the at least one coupling feature is disposed on the at least one wall;

a first connection feature disposed within the top side of the housing, wherein the first connection feature comprises a plurality of pins, wherein the plurality of pins is configured to directly couple to an electrical connector for the existing light fixture, wherein the electrical connector comprises a plurality of pin receivers;

a second connection feature disposed within the bottom side of the housing, wherein the second connection feature is configured to couple to a light source of a retrofit light fixture; and a power transfer device disposed within the chamber of the housing, wherein the power transfer device comprises a first end electrically coupled to the first connection feature and a second end electrically coupled to the second connection feature, wherein the power transfer device is configured to receive a power input at the first end from the first connection feature, and wherein the power transfer device is configured to deliver a power output at the second end to the second connection feature, wherein the at least one coupling feature is configured to secure the housing to a component of a lighting system, wherein the lighting system comprises the existing light fixture and the retrofit light fixture; wherein the at least one coupling feature comprises a base, an aperture, and a recess, wherein the base is disposed at the bottom side of the housing, wherein the aperture traverses the base, and wherein the recess is disposed in the wall of the housing between the base and the top side of the housing.

2. The electrical connection adapter of claim 1, wherein the power transfer device comprises a rectifier, wherein the power input is alternating current, and wherein the power output is direct current.

3. The electrical connection adapter of claim 1, wherein the second connection feature is at least one wire, wherein the at least one electrical wire is configured to couple to a light source of the retrofit light fixture.

4. The electrical connection adapter of claim 3, wherein the at least one wall of the housing comprises at least one wireway that traverses therethrough, wherein the at least one wireway is configured to receive the at least one electrical wire.

5. The electrical connection adapter of claim 1, wherein the chamber protrudes above a top wall of the at least one wall.

6. The electrical connection adapter of claim 1, wherein the aperture of the at least one coupling feature is configured to receive a complementary coupling feature, wherein the complementary coupling feature comprises a screw.

7. The electrical connection adapter of claim 1, wherein the at least one coupling feature comprises a first coupling feature and a second coupling feature, wherein the first coupling feature and the second coupling feature are disposed substantially opposite each other relative to the housing.

8. A light fixture, comprising:

- an existing light fixture comprising an electrical connector, wherein the electrical connector comprises a plurality of pin receivers; and
- a retrofit light fixture comprising:
  - a light source; and
  - a connection adapter electrically coupled to the electrical connector and the light source, wherein the retrofit light fixture comprises:
    - a housing comprising at least one wall and at least one coupling feature, wherein the at least one wall forms a chamber disposed between a top side and a bottom side of the housing, and wherein the at least one coupling feature is disposed on the at least one wall;
    - a first connection feature disposed within the top side of the housing, wherein the first connection feature comprises a plurality of pins, wherein the plurality of pins of the first connection feature is directly coupled to the plurality of pin receivers of the electrical connector of the existing light fixture;
    - a second connection feature disposed within the bottom side of the housing, wherein the second connection feature is coupled to the light source of the retrofit light fixture; and
    - a power transfer device disposed within the chamber of the housing, wherein the power transfer device comprises a first end electrically coupled to the first connection feature and a second end electrically coupled to the second connection feature, wherein the power transfer device is configured to receive a power input at the first end from the connection feature, and wherein the power transfer device is configured to deliver a power output at the second end to the light source,
    - wherein the at least one coupling feature secures the housing to the existing light fixture or the retrofit light fixture; wherein the at least one coupling feature comprises a base, an aperture, and a recess, wherein the base is disposed at the bottom side of the housing, wherein the aperture traverses the base, and wherein the recess is disposed in the wall of the housing between the base and the top side of the housing.

9. The light fixture of claim 8, wherein the existing light fixture further comprises a power source electrically coupled to the electrical connector, wherein the power source generates the power input.

10. The light fixture of claim 8, wherein the light source operates using the power output.

11. The light fixture of claim 8, wherein the second connection feature comprises at least one electrical wire that is coupled to the light source of the retrofit light fixture.

12. The light fixture of claim 8, wherein the light source of the retrofit light fixture comprises at least one light-emitting diode (LED).

13. The light fixture of claim 12, wherein the at least one LED replaces a replaced light source of the existing light fixture.

14. The light fixture of claim 13, wherein the power transfer device is a driver for the at least one LED of the retrofit light fixture.

15. The light fixture of claim 8, wherein the power transfer device comprises a rectifier that receives the power input that is alternating current power and generates the output power that is direct current power.

16. The light fixture of claim 8, wherein the electrical connector is part of a wire whip of the existing light fixture.

17. A lighting system, comprising:

- an existing light fixture portion comprising a power source and an electrical connector, wherein the electrical connector comprises a plurality of pin receivers; and
- a retrofit light fixture portion comprising:
  - a light source; and
  - a connection adapter electrically coupled to the electrical connector and the light source, wherein the connection adapter comprises:
    - a housing comprising at least one wall and at least one coupling feature, wherein the at least one wall forms a chamber disposed between a top side and a bottom side of the housing, and wherein the at least one coupling feature is disposed on the at least one wall;
    - a first connection feature disposed within the top side of the housing, wherein the first connection feature comprises a plurality of pins, wherein the plurality of pins of the first connection feature are directly coupled to the plurality of pin receivers of the electrical connector of the existing light fixture;
    - a second connection feature disposed within the bottom side of the housing, wherein the second connection feature is coupled to the light source of the retrofit light fixture; and
    - a power transfer device disposed within the chamber of the housing, wherein the power transfer device comprises a first end electrically coupled to the first connection feature and a second end electrically coupled to the second connection feature, wherein the power transfer device is configured to receive a power input at the first end from the connection feature, and wherein the power transfer device is configured to deliver a power output at the second end to the light source,
  - wherein the at least one coupling feature secures the housing to the existing light fixture or the retrofit light fixture; wherein the at least one coupling feature comprises a base, an aperture, and a recess, wherein the base is disposed at the bottom side of the housing, wherein the aperture traverses the base, and wherein the recess is disposed in the wall of the housing between the base and the top side of the housing.

18. The lighting system of claim 17, wherein the light fixture complies with at least one Underwriters Laboratory standard.

* * * * *